United States Patent [19]

Tate

[11] 4,023,596

[45] May 17, 1977

[54] SECURING MEANS FOR MINIMUM WEIGHT AND VOLUME STRUCTURAL SUPPORTS

[76] Inventor: Sherman E. Tate, Rte. 3, Box 246, Hartselle, Ala. 35640

[22] Filed: Sept. 30, 1974

[21] Appl. No.: 510,523

[52] U.S. Cl. .............................. 138/111; 138/103; 138/156; 138/178; 52/586; 285/188; 138/166
[51] Int. Cl.² .......................................... F16L 9/18
[58] Field of Search .......... 138/103, 106, 108, 111, 138/112, 115, 165–168, 177, 178, DIG. 11, 128, 151, 156, 158; 285/137 R; 248/49; 220/23.4; 215/6; D23/43–45

[56] References Cited

UNITED STATES PATENTS

| | | | |
|---|---|---|---|
| 333,119 | 12/1885 | Ephraim | 138/111 |
| 722,249 | 3/1903 | Pixley | 138/115 X |
| 798,196 | 8/1905 | Lyle | 138/115 X |
| 2,144,630 | 1/1939 | Kotrbaty | 52/586 X |
| 2,564,093 | 8/1951 | Bijl | 138/111 X |
| 2,577,120 | 12/1951 | Franz | 138/111 X |
| 3,065,574 | 11/1962 | Piana | 50/268 |
| 3,194,426 | 7/1965 | Brown | 220/23.4 |
| 3,380,481 | 4/1968 | Kraus | 138/166 X |
| 3,425,586 | 2/1969 | Peters et al. | 220/23.4 |
| 3,526,934 | 9/1970 | Owen | 138/106 X |

FOREIGN PATENTS OR APPLICATIONS

| | | | |
|---|---|---|---|
| 289,189 | 1/1914 | Germany | 138/156 |
| 577,543 | 5/1946 | United Kingdom | 52/586 |
| 18,212 | 8/1912 | United Kingdom | 138/111 |

Primary Examiner—Richard E. Aegerter
Assistant Examiner—James E. Bryant, III
Attorney, Agent, or Firm—Nathan Edelberg; Robert P. Gibson; James T. Deaton

[57] ABSTRACT

A plurality of parallel constructed members that have means for securing the two parallel members together along an axis parallel to the longitudinal axis of the members to lend structural support of the members relative to each other. This allows the structurally secured members to have structures having high strength to weight ratios and requiring minimum volume for the securing structure.

1 Claim, 4 Drawing Figures

SECURING MEANS FOR MINIMUM WEIGHT AND VOLUME STRUCTURAL SUPPORTS

DEDICATORY CLAUSE

The invention described herein may be manufactured, used, and licensed by or for the Government for govermental purposes without the payment to me of any royalty thereon.

BACKGROUND OF THE INVENTION

In the missile industry, there is a need for securing large parallel members such as air frames or fuel tanks with a minimum of the tank volume reguired for the securing means and a supporting structure that lends to the weight requirements of the overall missile.

Therefore, it is an object of this invention to provide a particular securing means for securing and supporting elongated members relative to each other using a minimum amount of weight and structural support therefor.

Another object of this invention is to provide means for securing two or more elongated parallel members together along an axis in which the two members can be slip fitted together.

A further object of this invention is to provide a structure that adapts itself to portability and quick assembly and/or disassembly.

Other objects and advantages of this invention will be obvious to those skilled in this art.

SUMMARY OF THE INVENTION

In accordance with this invention, elongated tubular members are secured together or keyed together along their periphery by means interlocking the elongated tubular members together along their length. This interlocking means can be a means that allows the elongated members to be slid together or a means that is placed between two elongated members and expanded into interlocking openings in each of the adjacent tubular members. The elongated tubular members may be ducts or they could even be tanks that need structural support in mounting these tanks adjacent each other.

DESCRIPTION OF THE PREFERRED EMBODIMENTS

Figure 1:
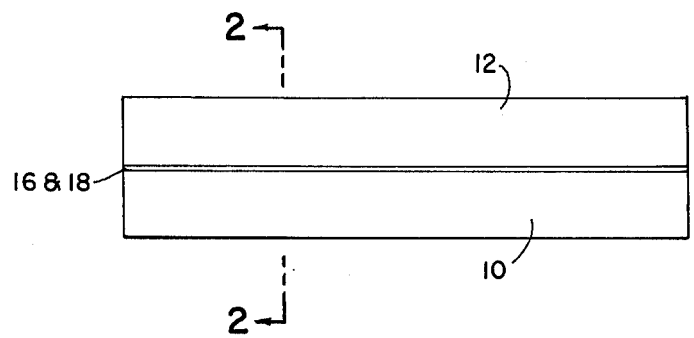
FIG. 1 is a perspective view according to this invention.
Figure 4:
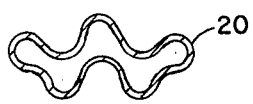
FIG. 4 is a sectional view of a member that may be expanded to key the tubular ducts.

Referring now to FIG. 1, elongated ducts 10 and 12 are made of material such as steel, aluminum and titanium. The preferred starting material is designed extruded stock, but may be formed from sheet, plate or even castings. Members 10 and 12 are secured together along the longitudinal side thereof by interlocking member 14 mounted in grooves or openings 16 and 18 in each of members 10 and 12. The interlocking means extends the longitudinal length of tubular or duct members 10 and 12 to give structural support even though members 10 and 12 are relatively thin in structure. Any number of these members can be secured together in any particular configuration desired to provide the duct or tank work and structural support necessary. Also, member 14 may be preformed and tubular members 10 and 12 slip fitted with member 14. However, if desired an irregular shaped structure 20 such as shown in FIG. 4 may be placed between openings 16 and 18 in duct members 10 and 12 and expanded into the shape of openings 16 and 18 to secure duct members 10 and 12 together. Member 20 would have to be made of a material that hardend as it was worked and could be deformed by placing pressure thereon by any suitable source for expanding the shape thereof into the shape of openings 16 and 18 of members 10 and 12. Also, if desired the outer surface of member 14 or the inner surface of openings 16 and 18 or both of the surfaces may be coated with adhesive 22 to lend strength and rigidity to the overall structure and joint.

Figure 3:
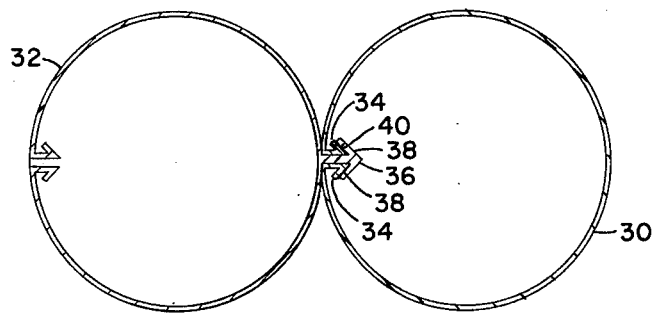
FIG. 3 is a perspective view of another embodiment according to this invention.

Referring now to FIG. 3, another embodiment is illustrated in which members 30 and 32 are prefabricated from sheet metal and joined together along the longitudinal length of these members by a joint that is either snap fitted or slip fitted together. Members 30 and 32 are held together along their longitudinal length by flange opening 34 of member 30 and by expanded member 36 that has protruding lips 38 for interlocking relation with flanges 34. In this embodiment, the tubular members can either be slid together or enough tolerance can be allowed between the two members to allow them to be snapped together.

Also, in the embodiment of FIG. 3 the interlocking members may be coated with adhesive 40 to more rigidly secure the members together and provide a stronger structure. Also, as many tubular members as desired may be secured together in various shapes to provide the structure desired for carrying the various components or material as desired.

Figure 2:
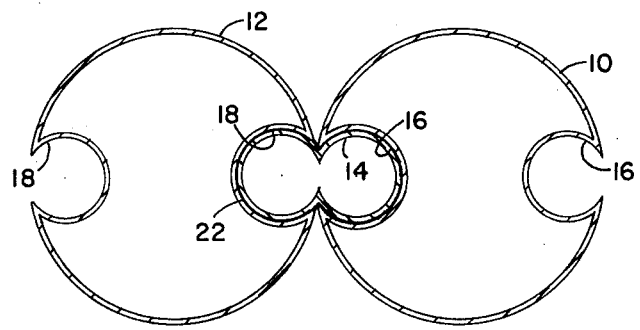
FIG. 2 is a sectional view along line 2—2 of FIG. 1.

In the embodiment as illustrated in FIGS. 1, 2 and 4, the member securing tubular ducts 10 and 12 together also forms a channel therethrough for acting as a duct itself. Since member 14 has an opening therethrough that can act as a duct, a minimum amount of space is utilized in the structural support for the various members and also a minimum amount of weight is used in providing a maximum amount of support.

I claim:

1. A support structure comprising a plurality of elongated ducts and means extending longitudinally along a longitudinal length of said ducts and interlocking the ducts together to lend structural support to the ducts, said ducts being made of sheet metal, said interlocking means including one of said ducts having an opening extending completely therethrough and having flanges formed from said sheet metal at said opening by having opposing terminated sides of said sheet metal projecting inwardly relative to a center line longitudinally of said one of said ducts to define said opening between said opposing terminated sides, said interlocking means further including another of said ducts having a protrusion with lips thereon, said lips being positioned completely through said opening and interlocking with and completely overlapping said flanges to secure said members together, said lips and protrusion extending the longitudinal length of said another duct and said opening also extending the longitudinal length of said one duct to provide a relative light and structurally supported support structure whereby said elongated ducts can be snapped together to form said support structure, and said flanges and said lips having adhesive placed therebetween to more securely fasten the duct members together and lend additional structural support to the support structure.

* * * * *